July 5, 1932. L. E. ROBERTS 1,866,423
FRESH FLOWER DOOR BADGE
Filed May 12, 1931
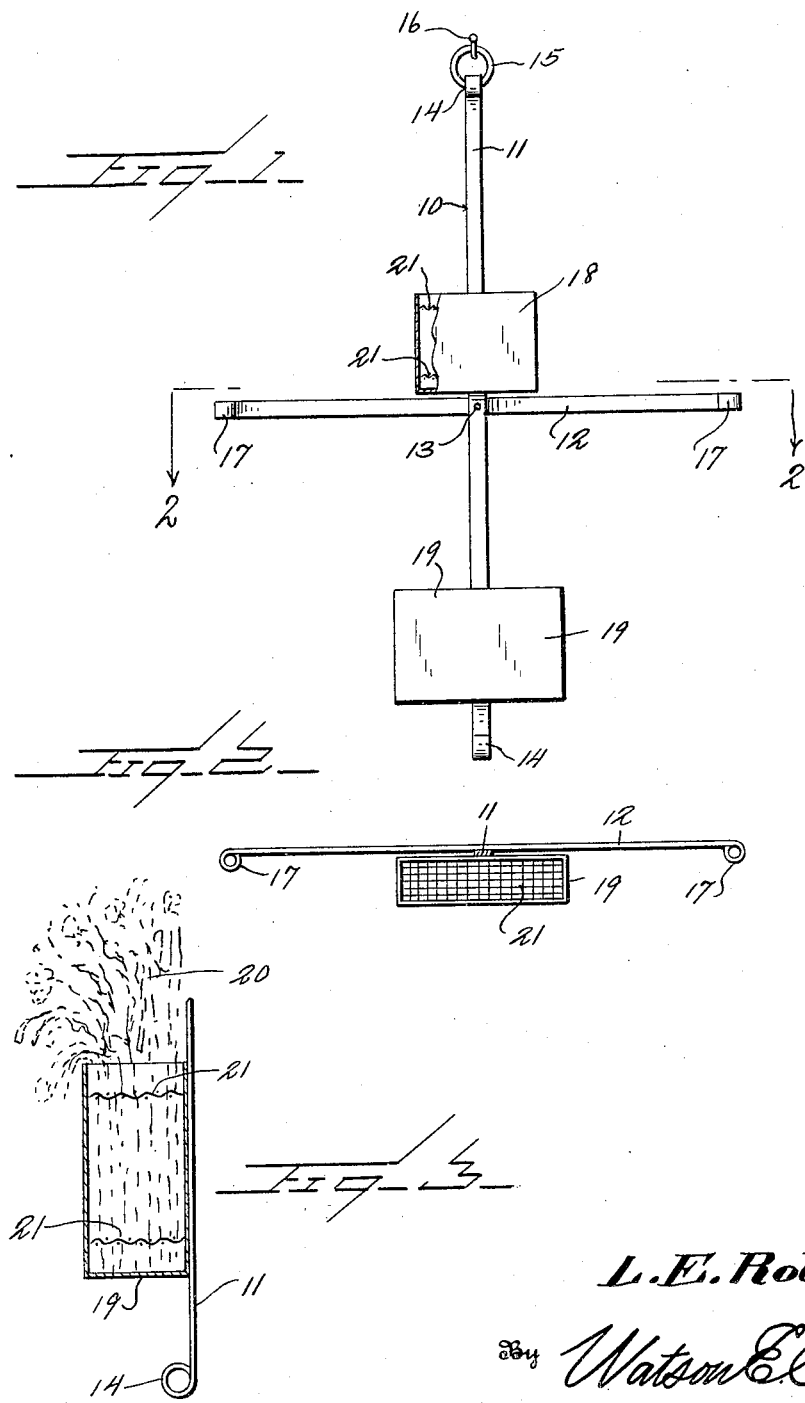
Inventor
L. E. Roberts
By Watson E. Coleman
Attorney Patented July 5, 1932

1,866,423

UNITED STATES PATENT OFFICE

LEWIS EDWIN ROBERTS, OF FLINT, MICHIGAN

FRESH FLOWER DOOR BADGE

Application filed May 12, 1931. Serial No. 536,923.

This invention relates to fresh flower door badges which are adapted to be mounted on a door or door frame.

An object of this invention is to provide means for supporting fresh flowers to be used as a door badge in place of the conventional imitation flower funeral badge.

Another object of this invention is to provide in a device of this kind means for maintaining the flowers in fresh condition during the time they are mounted on the door.

A further object of this invention is to provide superposed receptacles for holding water or the like and at the same time for holding the stems of flowers in adjusted position.

The above and various other objects and advantages of this invention will in part be described in and in part be understood from the following detail description of the present preferred embodiment, the same being illustrated in the accompanying drawing, wherein:—

Figure 1 is a detail front elevation partly broken away of a device constructed according to the preferred embodiment of this invention;

Figure 2 is a sectional view taken on the line 2—2 of Figure 1, and

Figure 3 is a fragmentary vertical section partly in detail of the device.

Referring to the drawing wherein like numerals of reference designate corresponding parts throughout the several views, the numeral 10 designates generally a frame structure comprising a vertically disposed bar 11 and a horizontal bar 12 which is secured to the vertical bar 11 intermediate the ends thereof by means of a securing member 13 or the like. Each end of the bar 11 is looped to form an eye 14, and in the upper eye 14, there is positioned a ring 15 for engagement with a supporting hook 16 which is mounted on a vertical supporting structure. Each end of the horizontal bar 12 is reverted and formed into an eye on the loop 17. Through the provision of this horizontal bar 12, the flowers which are mounted in the lower receptacle 19 may be held in spread formation by string or other flexible means looped about the stems of the flowers and engaged with the horizontal bar, so that the upper receptacle 18 will be substantially concealed by the flowers carried by the lower receptacle 19.

In order to support fresh flowers on the frame 10, I have provided an upper receptacle 18 and a lower receptacle 19 which are secured to the vertical bar 11. These receptacles 18 and 19 are provided with open upper end portions and are adapted to receive water or the like for maintaining flowers 20 in fresh condition.

The receptacles 18 and 19 are also provided with spaced screen members 21 which are positioned within the receptacles intermediate the upper and lower ends thereof and in spaced relation to each other, these screen members 21 being of relatively wide mesh so as to permit the projection of the stems of flowers therethrough for holding the flowers in desired position. By providing an upper and lower receptacle 18 and 19, respectively, when flowers are positioned in these receptacles, the entire frame will be covered or hidden behind the flowers and the usual or conventional ribbon may be secured to the frame 10 and passed through the flowers.

If desired, the horizontal bar 12 may be permitted to have relative movement on the pivot 13 so that when it is desired to remove the flowers from the receptacles, the horizontal bar 12 may be swung into substantial alinement with the vertical bar 11 so that the device will not occupy a large space. This will also facilitate shipment of the device from the manufacturer to the seller.

It is, of course, understood that various changes and modifications may be made in the details of construction and design of the above specifically described embodiment of this invention without departing from the spirit thereof, such changes and modifications being restricted only by the scope of the following claim.

I claim:—

A door badge of the character described comprising a vertical bar, an eye member carried by one end of the bar, a ring disposed in said eye member, a horizontal bar, means for swingably securing the horizontal bar to said vertical bar intermediate the ends thereof, an upper receptacle mounted on said vertical bar above said horizontal, bar, a lower receptacle mounted on said vertical bar below said horizontal bar, and means disposed within each of said receptacles whereby to hold flower stems in adjusted position within the receptacles.

In testimony whereof I hereunto affix my signature.

LEWIS EDWIN ROBERTS.